United States Patent [19]
Park

[11] 3,735,687
[45] May 29, 1973

[54] ROTARY SHUTTER

[76] Inventor: Wallace Sidney Park, P.O. Box 21379, Louisville, Ky. 40221

[22] Filed: Nov. 25, 1970

[21] Appl. No.: 92,714

[52] U.S. Cl. ..................................................95/61
[51] Int. Cl. ..........................G03b 9/14, G03b 9/16
[58] Field of Search..............................95/61, 12.5

[56] References Cited

UNITED STATES PATENTS

| | | |
|---|---|---|
| 2,350,355 | 6/1944 | Hoffmann ..............................95/61 |
| 2,383,381 | 8/1945 | Hammond.............................95/61 |
| 2,474,323 | 6/1949 | Rattray................................95/12.5 |

FOREIGN PATENTS OR APPLICATIONS

| | | |
|---|---|---|
| 524,231 | 5/1921 | France .....................................95/61 |

Primary Examiner—John M. Horan
Attorney—Birch & Birch

[57] ABSTRACT

A high speed camera is especially adapted for aerial photography and it includes conventional rotary discs and a capping shutter. The rotary discs contain openings for alignment with the aperture of the camera. These discs, instead of being rotated synchronously, are rotated at different speeds, e.g. 4 to 3, respectively, whereby the disc openings become aligned with the camera aperture on multiple revolutions of the discs rather than on only one revolution. This permits operation of the capping shutter at a much slower speed, thus avoiding the impact forces of conventonal cameras when operating the capping shutter.

12 Claims, 8 Drawing Figures

PATENTED MAY 29 1973 3,735,687

INVENTOR
WALLACE SIDNEY PARK

BY Birch + Birch

ATTORNEY 3,735,687
SHEET 2 OF 2
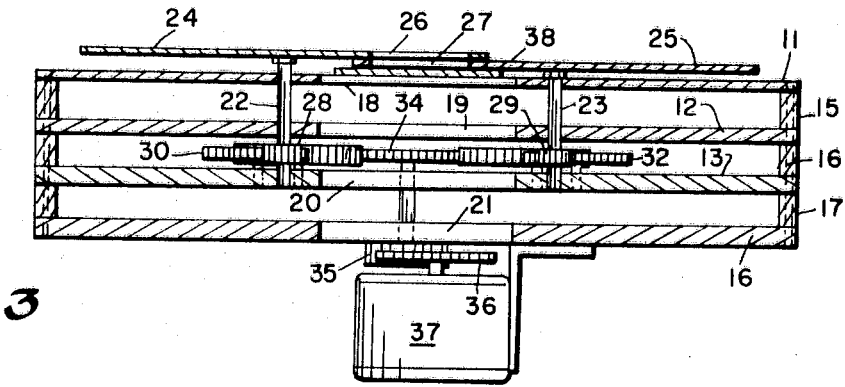
Fig. 3
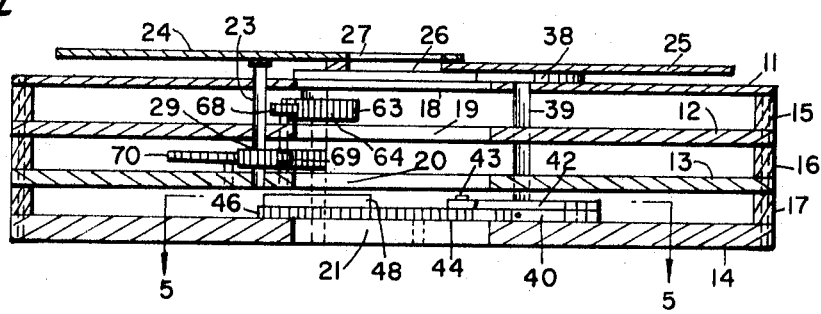
Fig. 4
Fig. 5
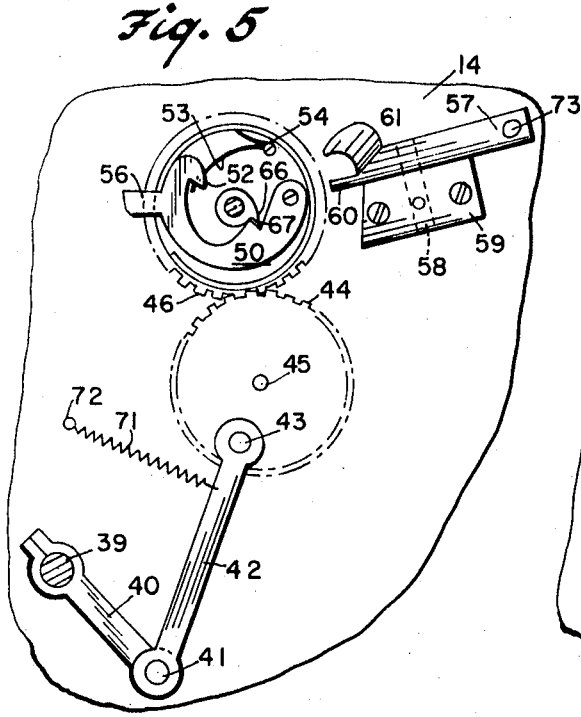
Fig. 6
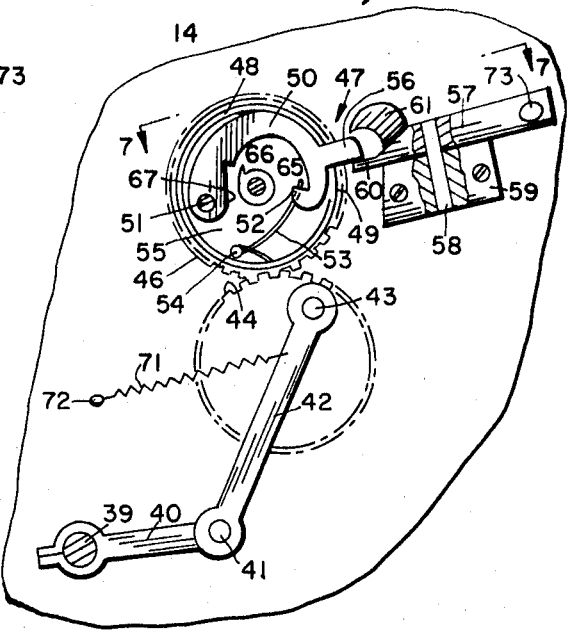
Fig. 7
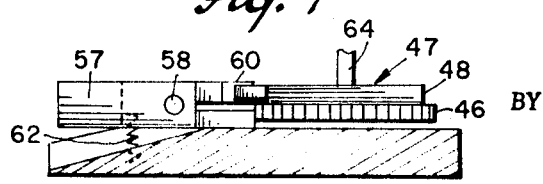
INVENTOR
WALLACE SIDNEY PARK
BY Birch & Birch
ATTORNEY

ROTARY SHUTTER

This invention relates to rotary shutters and it is more particularly concerned with improvements in rotary shutters of cameras such as high speed cameras used for aerial photography.

Conventional rotary shutters for high speed cameras comprise a pair of rotating discs mounted on opposite sides of the aperture of the camera having aperture openings and a capping shutter independently actuatable. The discs are synchronously rotated at the same speed whereupon the openings are aligned with the camera aperture once each revolution of the discs. When it is desired to admit light to the aperture, the capping shutter is opened and it must be quickly closed before the discs make another revolution to avoid a double exposure. This requires an extremely rapid action mechanism for actuating the capping shutter to open position and for returning it to its initial closed position. Conventional devices for performing these high speed operations are required to be so quick and powerful that they produce impact forces in the camera which are transmitted to the host airplane in which the camera may be mounted. These undesirable impact forces are sometimes sufficiently severe to misalign the camera or cause fatigue failure in structural parts.

An object of the invention is the provision of a camera having rotary shutter discs and a capping shutter which can be operated at a slower rate of speed than capping shutters of conventional cameras, thereby avoiding excessive impact forces commonly encountered in the opening and closing of such capping shutters.

Another object of the invention is the provision of a tripping mechanism which is positive in operation, rugged in construction and simple to use.

A further object is the provision of a camera having rotary disc shutters and a capping shutter which are related to each other so that the capping shutter can be operated relatively slower than that of the conventional cameras.

These and still further objects, features and advantages of the invention will appear more fully from the following description considered together with the accompanying drawing.

In the drawing:

FIG. 3 is a cross-sectional view along the line 3—3 of FIG. 1.

FIG. 4 is a cross-sectional view along the line 4—4 of FIG. 2.

FIG. 5 is a view of a fragmentary portion along the line 5—5 of FIG. 4.

FIG. 6 is a view similar to FIG. 5 with the shutters in closed position.

FIG. 7 is a view of a fragmentary portion along the line 7—7 of FIG. 6.

Figure 1:
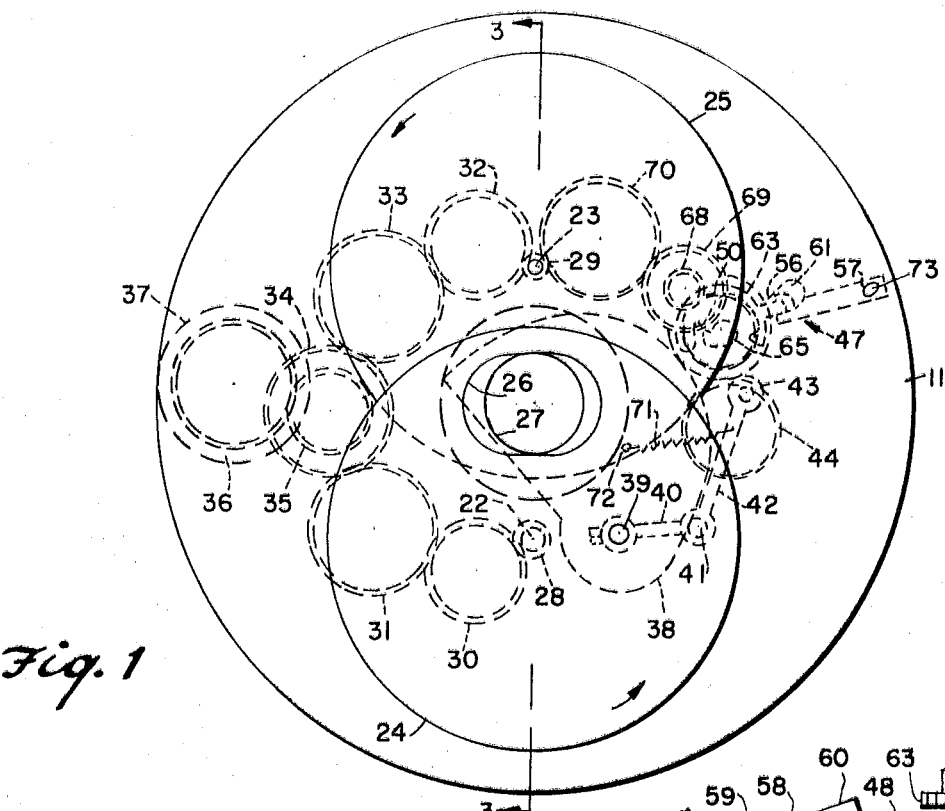
FIG. 1 is a face view of the mechanism with all shutters in closed position.
Figure 8:
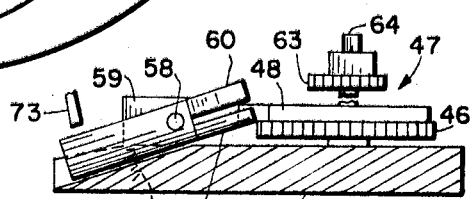
FIG. 8 is a view similar to FIG. 7 with the tripping lever in its upper position.
Figure 2:
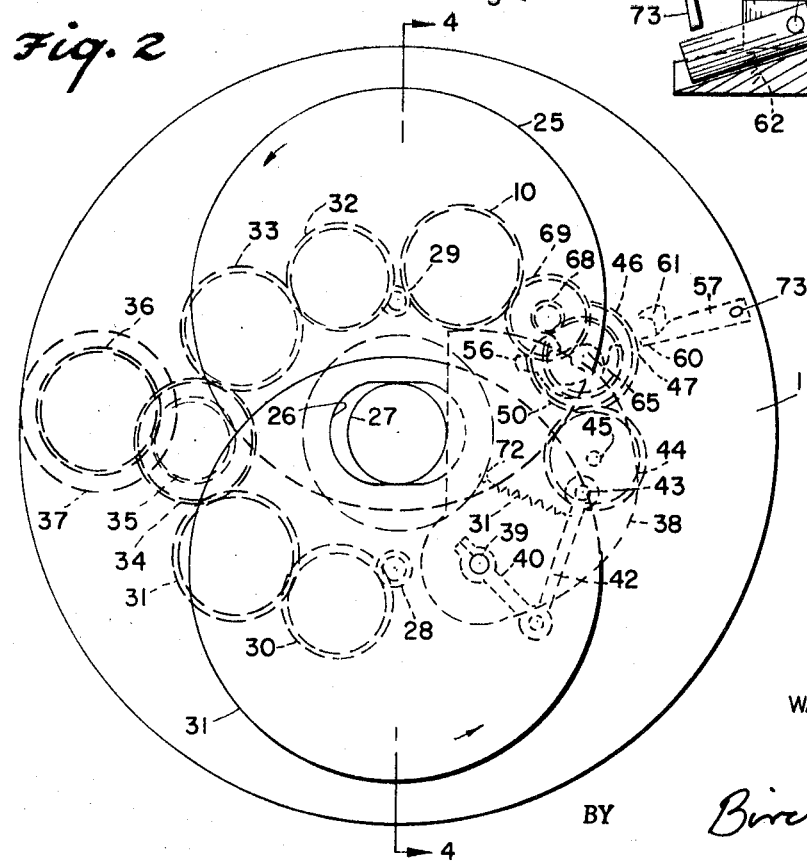
FIG. 2 is a view similar to FIG. 1 with the shutters in open position.

Referring to the drawing with more particularity, the embodiment illustrated comprises a suitable frame structure such as a series of plates 11, 12, 13 and 14, held together in aligned spaced relation by a series of outer rings 15, 16 and 17. Each disc is provided with a central aperture 18, 19, 20 and 21, respectively, through which photographic light passes from the exterior of the camera to the interior of the camera (not shown).

Shafts 22 and 23 are rotatably mounted in suitable bearings on opposite sides of the apertures. To the outer ends of these shafts are secured discs 24 and 25 which mutually overlap each other and which also overlap the apertures 18, 19, 20 and 21. The overlapped portion of the discs 24 and 25 have apertures 26 and 27 which can be brought into registry.

The shafts 22 and 23 are provided with spur gears 28 and 29, respectively, which are connected each to a train of gears 30, 31 and 32, 33. The gears 31 and 33 are mutually connected to a common gear 34 which is driven by a gear 35 connected to a gear 36 of the take-off shaft of an electric motor 37. These trains of gears are so related to each other that the disc 24 rotates in relation to the disc 25 $n$ to $n-1$, respectively, e.g. 4 to 3. By such an arrangement the openings 26 and 27 are brought into registry once every $n$ revolutions of the disc 24 and every $n-1$ revolutions of the disc 25. Closure is effected on the subsequent $n-1$ revolutions.

The speed of the motor 37 and hence the speed of the discs 24 and 25 are controlled by a conventional rheostat (not shown) connected to the motor.

A capping shutter 38 is pivotally mounted on a shaft 39. An arm 40 has one end fixed to the shaft 39 and the other end connected by a pin 41 to a link 42. The other end of the link 42 is connected by pins 43 to one side of a gear 44. The gear 44 is rotatably mounted on a shaft 45 and is meshed with a gear 46 of the tripping unit 47. Recessed from the periphery of the gear 46 is a circular wall 48 having an opening 49 on one side. Within the wall 48 a semicircular arm 50 is pivoted at one end by a stub shaft 51. The other end has an inwardly turned hook portion 52 which is connected to one end of a hairspring 53. The other end of the hairspring is anchored by a screw 54 to the face 55 of the gear 46. A finger 56 integral with the arm 50 extends through the opening 49 to abut a lever 57 pivoted by shaft 58 to a fixed bracket 59. The lever has an upper projection 60 and a lower projection 61 which can alternately be brought in the path of rotation of the finger 56 by actuating the lever. The lever is biased by a spring 62 to a position whereby the upper projection 60 is normally in the path of rotation of the finger 56. By depressing the lever 57 against the action of the spring 62, the upper projection 60 is elevated above the path of rotation of the finger 56 and the lower projection 61 is brought into alignment with the path of rotation of the finger 56. The projections 60 and 61 are spaced apart laterally to straddle finger 49. (See FIG. 6).

Above the gear face 55 there is rotatably mounted a spur gear 63 on a shaft 64. The end of the shaft 64 adjacent the face 55 of the gear 46 is provided with a collar 65 which has a spur 66 adapted to engage a notch 67 of the arm 50 when the arm is moved by the finger 56 under the action of the hairspring 53 to the position shown in FIG. 5.

The gear 63 is constantly driven through a train of gears 68, 69 and 70 connected to the gear 29.

The motor 37 through the train of gears constantly drives the discs 24 and 25 at different speeds, such as 4 to 3, respectively, whereupon the openings 26 and 27 are aligned periodically depending upon the speed of the motor which is controlled through the rheostat. The shutter 38 is normally closed as shown in FIG. 1. When it is desired to open the shutter, the lever 57 is depressed against the action of the spring 62 thereby releasing the finger 56 and premitting engagement of the rotating spur 66 with the notch 67 of the arm 50 which causes the gear 46 to rotate with the gear 63. This in turn causes the gear 44 to rotate and move the arm pivot 43 from the position shown in FIG. 6 to the position shown in FIG. 5, thereby causing the shutter to open.

As the finger 56 completes a single rotation with the gear 44, the arm pivot 43 returns to its initial position which closes the shutter. The finger abuts either the upper projection 60 or the lower projection 61, depending upon whether the lever has been released. In either event such contact moves the arm 50 to disengage the notch 67 with the spur 66 bringing the mechanism to its initial position. A coil spring 71 cnnnected between the arm 42 and a stationary point 72 of the device applies a biasing force through the gear 44 to the gear 46 and thereby urges the finger 56 to abut the projection 60 or 61, as the case may be, in preparation for a succeeding tripping operation and also insuring disengagement between the spur 66 and lever 50 against the biasing action of the spring 53.

The lever 57 may be operated by any suitable remote control means (not shown) through actuation of a push rod 73.

I claim:

1. In a high speed camera having an exposure aperture, two rotary disk shutters, said disk shutters having aperture openings alignable with each other and said exposure aperture, and a capping shutter for opening and closing said exposure aperture the improvement comprising: means for rotating said rotary disk shutters at different relative speeds to cause said aperture openings therein to approach each other from opposite directions and become aligned with each other and said exposure aperture at intervals corresponding to multiple revolutions of said rotary disk shutters, and means for opening and closing said capping shutter during said intervals, including a first shaft, means for constantly driving the shaft, a second shaft normally stationary, and a releasable coupling between said shafts, including a spur connected to the rotating shaft and a lever having a spur engageable notch pivotally connected to the other shaft, said lever being movable between positions of engagement and disengagement with the spur and means for moving the lever between said positions.

2. In a high speed camera as defined by claim 1 in which the relative speeds of the rotary shutters are $n$ and $n - 1$, respectively, per unit time.

3. In a high speed shutter defined by claim 1 in which the relative speeds of the rotary shutters are 4 and 3, respectively, per unit time.

4. In a high speed camera as defined by claim 1, means biasing the lever to a position of engagement with the spur.

5. In a high speed camera as defined by claim 1 in which the biasing means comprises a hairspring.

6. In a high speed camera as defined by claim 4 and overriding counterbiasing means for intermittently moving the lever to disengagement with the spur.

7. n a high speed camera as defined by claim 4 and means for moving the lever to a position of disengagement against the rotation of said biasing means.

8. In a high speed camera as defined by claim 1 in which the lever has a finger integral therewith for moving the lever, abutments rotatable with the lever shaft for limiting the movement of the finger relative to the lever shaft to positions of engagement and disengagement of the spur with the lever.

9. In a high speed camera as defined by claim 8 having an abutment in the path of travel of the finger and means for moving the abutment in and out of the path of travel of the finger.

10. In a high speed camera as defined by claim 9 in which two abutments are provided and means for alternately bringing one of the abutments in the path of travel of the finger to the exclusion of the other abutment.

11. In a high speed camera as defined by claim 10 in which the abutments are provided on a pivoted lever and means biasing the lever to a position where one abutment lies in the path of travel of the finger.

12. In a high speed camera as defined by claim 11 in which the abutments are spaced apart on the lever to straddle the finger.

* * * * *